US010981622B2

(12) United States Patent
Ikeda

(10) Patent No.: US 10,981,622 B2
(45) Date of Patent: Apr. 20, 2021

(54) HYDRAULIC PRESSURE CONTROLLER, HYDRAULIC BRAKE SYSTEM, AND BICYCLE

(71) Applicant: Robert Bosch GmbH, Stuttgart (DE)

(72) Inventor: Shigeki Ikeda, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 16/063,696

(22) PCT Filed: Nov. 24, 2016

(86) PCT No.: PCT/IB2016/057097
§ 371 (c)(1),
(2) Date: Jun. 18, 2018

(87) PCT Pub. No.: WO2017/115171
PCT Pub. Date: Jul. 6, 2017

(65) Prior Publication Data
US 2020/0269949 A1 Aug. 27, 2020

(30) Foreign Application Priority Data

Dec. 18, 2015 (JP) .............................. JP2015-247666

(51) Int. Cl.
*B60T 8/36* (2006.01)
*B62L 3/02* (2006.01)
(Continued)

(52) U.S. Cl.
CPC ............ *B62L 3/023* (2013.01); *B60T 8/3225* (2013.01); *B60T 8/3685* (2013.01);
(Continued)

(58) Field of Classification Search
CPC ............ B62K 21/06; B62L 3/023; B60T 8/36
(Continued)

(56) References Cited

U.S. PATENT DOCUMENTS 6,202,802 B1 * 3/2001 Nakamura ................ B60T 5/00
188/24.11
6,231,063 B1 * 5/2001 Chi ........................ B62K 21/06
280/276
(Continued)

FOREIGN PATENT DOCUMENTS

DE 10158382 6/2003
JP S5820988 U 2/1983
(Continued)

OTHER PUBLICATIONS

International Search Report for Application No. PCT/IB2016/057097 dated Mar. 1, 2017 (English Translation, 3 pages).

*Primary Examiner* — Christopher P Schwartz
(74) *Attorney, Agent, or Firm* — Michael Best & Friedrich LLP

(57) ABSTRACT

The invention obtains a hydraulic pressure controller whose control of a braking force is suppressed from becoming unstable. The invention also obtains a hydraulic brake system that includes such a hydraulic pressure controller, and a bicycle. A hydraulic pressure controller 110 controls hydraulic pressure of a brake fluid that is at least supplied to a front-wheel braking section 17 of a bicycle 200, and includes: a base section that is formed with a channel, through which the brake fluid flows, therein; a valve that is attached to the base section and opens and closes the channel; and a coupling section that couples the base section to the bicycle 200. The coupling section is coupled to a turning section 10 of the bicycle 200, the turning section 10 turning about an axis of a head tube 1A.

20 Claims, 11 Drawing Sheets

(51) Int. Cl.
 *B60T 8/32* (2006.01)
 *B62K 19/32* (2006.01)
 *B62K 23/06* (2006.01)

(52) U.S. Cl.
 CPC .......... *B60Y 2400/81* (2013.01); *B62K 19/32* (2013.01); *B62K 23/06* (2013.01)

(58) Field of Classification Search
 USPC ....... 188/24.11, 344, 24.22, 151 R; 280/275, 280/276, 279
 See application file for complete search history.

(56) References Cited

U.S. PATENT DOCUMENTS

| | | | | |
|---|---|---|---|---|
| 8,783,429 | B2* | 7/2014 | Moore | B62K 23/06 188/344 |
| 10,427,658 | B2* | 10/2019 | Adachi | B60T 8/3685 |
| 2005/0093268 | A1* | 5/2005 | Chiang | B62K 21/06 280/279 |
| 2009/0134598 | A1* | 5/2009 | McKernan | B62K 21/06 280/279 |
| 2014/0157944 | A1 | 6/2014 | Galstad | |
| 2015/0329094 | A1* | 11/2015 | Weh | B62L 3/023 303/167 |
| 2018/0362004 | A1* | 12/2018 | Atsushi | B62L 3/023 |

FOREIGN PATENT DOCUMENTS

| | | |
|---|---|---|
| JP | H0713684 U | 3/1995 |
| JP | 2005349896 A | 12/2005 |
| JP | 3157911 U | 3/2010 |
| JP | 2012210891 | 11/2012 |
| JP | 2013103693 | 5/2013 |
| WO | 2009050961 | 4/2009 |
| WO | 2014016124 | 1/2014 |
| WO | 2014108234 | 7/2014 |

* cited by examiner

HYDRAULIC PRESSURE CONTROLLER, HYDRAULIC BRAKE SYSTEM, AND BICYCLE

BACKGROUND OF THE INVENTION

The invention relates to a hydraulic pressure controller for controlling hydraulic pressure of a brake fluid that is at least supplied to a front-wheel braking section of a bicycle, a hydraulic brake system including the hydraulic pressure controller; and a bicycle including the hydraulic brake system.

As a conventional brake system of a bicycle, for example, a brake system that includes: a front-wheel braking section for braking rotation of a front wheel; wire for changing a braking force generated in the front-wheel braking section when tension corresponding to an operation by a user is generated; and a tension controller for controlling the tension generated in the wire and thereby controlling the braking force generated in the front-wheel braking section is available. The tension controller is attached to a head tube of the bicycle, the head tube axially supporting a turning section that turns with a handlebar (for example, see WO 2014/016124).

SUMMARY OF THE INVENTION

Even in the cases where a hydraulic brake system, that is, a brake system for generating hydraulic pressure that corresponds to the operation by the user in a brake fluid filled in a brake circuit and thereby changing the braking force at least generated in the front-wheel braking section is adopted as a brake system, where braking performance of the bicycle is thus improved, and the like, similar to the above-described brake system, a controller that plays a similar role to the tension controller, that is, a hydraulic pressure controller for controlling the hydraulic pressure generated in the brake fluid and thereby controlling the braking force at least generated in the front-wheel braking section possibly becomes necessary.

In such a case, when the hydraulic pressure controller is attached to the head tube like the tensile controller, stress is generated in a brake fluid pipe that connects between a brake lever and the hydraulic pressure controller, a brake fluid pipe that connects between the front-wheel braking section and the hydraulic pressure controller, and the like by a turning operation of the handlebar by the user, for example. Consequently, control of the hydraulic pressure of the brake fluid becomes unstable. In addition, because an angle range of the bicycle in which the handlebar can turn is designed to be larger than that of a two-wheeled motor vehicle and the like, the stress to be generated tends to be increased. Thus, the unstable control of the hydraulic pressure of the brake fluid possibly becomes apparent.

In other words, in the cases where the hydraulic brake system, on which an influence of the stress generated in a brake transmission path is significant, is adopted for the bicycle and where the controller for controlling the braking force at least generated in the front-wheel braking section is attached to a similar position to that of the conventional brake system of the bicycle, there occurs such a problem that the control of the braking force is likely to become unstable.

The invention has been made with the above-described problem as the background and therefore obtains a hydraulic pressure controller that suppresses control of a braking force from becoming unstable. The invention also obtains a hydraulic brake system that includes such a hydraulic pressure controller. The invention further obtains a bicycle that includes such a hydraulic brake system.

A hydraulic pressure controller according to the invention is a hydraulic pressure controller that controls hydraulic pressure of a brake fluid that is at least supplied to a front-wheel braking section of a bicycle, and includes: a base section that is formed with a channel, through which the brake fluid flows, therein; a valve that is attached to the base section and opens and closes the channel; and a coupling section that couples the base section to the bicycle. The coupling section is coupled to a turning section of the bicycle, the turning section turning about an axis of a head tube.

In addition, a hydraulic brake system according to the invention includes the hydraulic pressure controller as described above.

Furthermore, a bicycle according to the invention includes the hydraulic brake system as described above.

Advantageous Effects of the Invention

In the hydraulic pressure controller, the hydraulic brake system, and the bicycle according to the invention, the base section that is formed with the channel, through which the brake fluid flows, therein is coupled to the turning section of the bicycle, the turning section turning about the axis of the head tube. Accordingly, for example, when a user turns a handlebar for an operation, a brake lever, a front-wheel braking section, and a brake fluid pipe integrally turn, and generation of stress on the brake fluid pipe is suppressed. Thus, in the case where the hydraulic brake system, on which an influence of the stress generated in a brake transmission path is significant, is adopted for the bicycle, control of a braking force is suppressed from becoming unstable.

DETAILED DESCRIPTION

A description will hereinafter be made on a hydraulic pressure controller, a hydraulic brake system, and a bicycle according to the invention by using the drawings.

Note that a description will hereinafter be made on a case where the hydraulic pressure controller and the hydraulic brake system according to the invention are applied to a normal bicycle; however, the hydraulic pressure controller and the hydraulic brake system according to the invention may be applied to another bicycle, such as an electric-assisted bicycle or an electric bicycle. Note that the bicycle means all types of vehicles including a pedal, to which a pedaling force of a user is applied. In addition, the normal bicycle means a bicycle that obtains a propulsion force only by the pedaling force of the user. Furthermore, the electric-assisted bicycle means a bicycle that has a function of assisting the pedaling force of the user with a motor. Moreover, the electric bicycle means a bicycle that has a function of obtaining the propulsion force only by the motor.

Note that each of a configuration, an operation, and the like, which will be described below, is merely one example, and the hydraulic pressure controller, the hydraulic brake system, and the bicycle according to the invention are not limited to a case with such a configuration, such an operation, and the like. For example, a description will hereinafter be made on a case where the hydraulic pressure controller according to the invention executes anti-lock brake control. However, the hydraulic pressure controller according to the invention may execute control other than the anti-lock brake control.

The same or similar members or portions will be denoted by the same reference sign in each of the drawings. In addition, a detailed structure will be depicted in an appropriately simplified manner or will not be depicted. Furthermore, an overlapping description will appropriately be simplified or will not be made.

First Embodiment

A description will hereinafter be made on a hydraulic brake system according to a first embodiment.
<Mode of Application of the Hydraulic Brake System to a Bicycle>

A description will be made on a mode of application of the hydraulic brake system according to the first embodiment to a bicycle.

Figure 1:
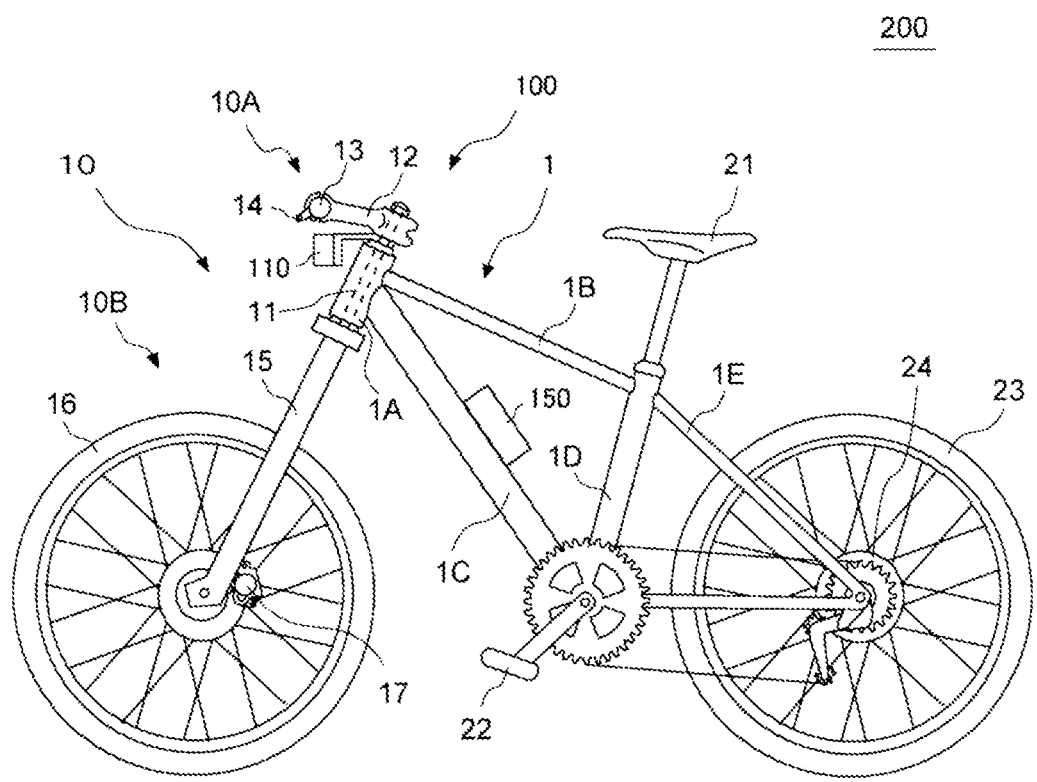
FIG. 1 is a view of schematic configurations of a hydraulic brake system according to a first embodiment of the invention and a bicycle, to which the hydraulic brake system is applied.

FIG. 1 is a view of schematic configurations of the hydraulic brake system according to the first embodiment of the invention and the bicycle, to which the hydraulic brake system is applied. Note that FIG. 1 depicts a case where a bicycle 200 is a two-wheeled vehicle; however, the bicycle 200 may be another bicycle such as a tricycle.

As depicted in FIG. 1, the bicycle 200 includes a frame 1, a turning section 10, a saddle 21, a pedal 22, a rear wheel 23, and a rear-wheel braking section 24.

The frame 1 includes: a head tube 1A that axially supports a steering column 11 of the turning section 10; a top tube 1B and a down tube 1C that are coupled to the head tube 1A; a seat tube 1D that is coupled to the top tube 1B and the down tube 1C and holds the saddle 21; and a stay 1E that is coupled to upper and lower ends of the seat tube 1D and to which the rear wheel 23 and the rear-wheel braking section 24 are attached.

The turning section 10 includes: an upper turning section 10A that turns on an upper side of the head tube 1A; and a lower turning section 10B that turns on a lower side of the head tube 1A.

The upper turning section 10A includes: a portion of the steering column 11 that is axially supported by the head tube 1A, the portion being projected to the upper side of the head tube 1A; and members held thereby. In other words, the upper turning section 10A includes: a handle stem 12 that is held by the steering column 11; a handlebar 13 that is held by the handle stem 12; and a braking operation section 14 that is attached to the handlebar 13.

The lower turning section 10B includes: a portion of the steering column 11 that is axially supported by the head tube 1A, the portion being projected below the head tube 1A; and members held thereby. In other words, the lower turning section 10B includes: a fork 15 that is coupled to the steering column 11; and a front wheel 16 and a front-wheel braking section 17 that are attached to the fork 15.

The braking operation section 14 includes: a mechanism that is used as an operation section of the front-wheel braking section 17; and a mechanism that is used as an operation section of the rear-wheel braking section 24. For example, the mechanism that is used as the operation section of the front-wheel braking section 17 is arranged on a right end side of the handlebar 13, and the mechanism that is used as the operation section of the rear-wheel braking section 24 is arranged on a left end side of the handlebar 13.

A hydraulic pressure controller 110 that controls hydraulic pressure of a brake fluid supplied to the front-wheel braking section 17 is coupled to the upper turning section 10A of the turning section 10 in the bicycle 200. The hydraulic pressure controller 110 may control the hydraulic pressure of the brake fluid that is supplied to the front-wheel braking section 17 and hydraulic pressure of a brake fluid that is supplied to the rear-wheel braking section 24. Alternatively, the rear-wheel braking section 24 may be a braking section of such a type that the brake fluid is not supplied thereto (for example, a braking section of a type that changes a braking force by making wire generate tension, or the like). In other words, the hydraulic pressure controller 110 controls the hydraulic pressure of the brake fluid that is at least supplied to the front-wheel braking section 17 of the bicycle 200.

A power supply unit 150 that serves as a power supply of the hydraulic pressure controller 110 is attached to the down tube 1C of the frame 1 of the bicycle 200. The power supply unit 150 may obtain power from a cell, a generator, or the like, or may obtain the power from a battery that stores the power generated by the generator or the like. Note that the cell may be a primary cell or a secondary cell. In addition, the generator includes a generator that generates the power by traveling of the bicycle 200 (for example, a hub dynamo that generates the power by rotation of the front wheel 16 or the rear wheel 23, a generator that is the motor as a drive source of the front wheel 16 or the rear wheel 23 and that generates regenerative power, or the like), a generator that generates the power by sunlight, and the like.

In other words, a hydraulic brake system 100 that includes the braking operation section 14, the front-wheel braking section 17, the rear-wheel braking section 24, the hydraulic pressure controller 110, and the power supply unit 150 is applied to the bicycle 200. The hydraulic brake system 100 at least supplies the brake fluid to the front-wheel braking section 17, and the hydraulic pressure of the brake fluid is controlled by the hydraulic pressure controller 110.

The hydraulic pressure controller 110 is disposed between the handle stem 12 and the front wheel 16. In other words, the hydraulic pressure controller 110 is not located in a primary ground contact portion of the bicycle 200. Note that a portion of the bicycle 200 that first comes in contact with a road surface or the like at a time when the bicycle 200 falls over is defined as the primary ground contact portion.

The turning section 10 is restricted from turning by a stopper (not depicted) and the like and thus cannot turn until the hydraulic pressure controller 110 abuts against the frame 1. The turning of the turning section 10 may not be restricted. Even in such a case, the hydraulic pressure controller 110 only needs to be held in such a state where the frame 1 is not located on a trajectory of the hydraulic pressure controller 110. In other words, turning of the turning section 10 may be restricted, or turning thereof may not be restricted. The turning section 10 only turns at such an angle that the hydraulic pressure controller 110 does not abut against the frame 1.

<Configuration of the Hydraulic Brake System>

A description will be made on a configuration of the hydraulic brake system according to the first embodiment.

Figure 2:
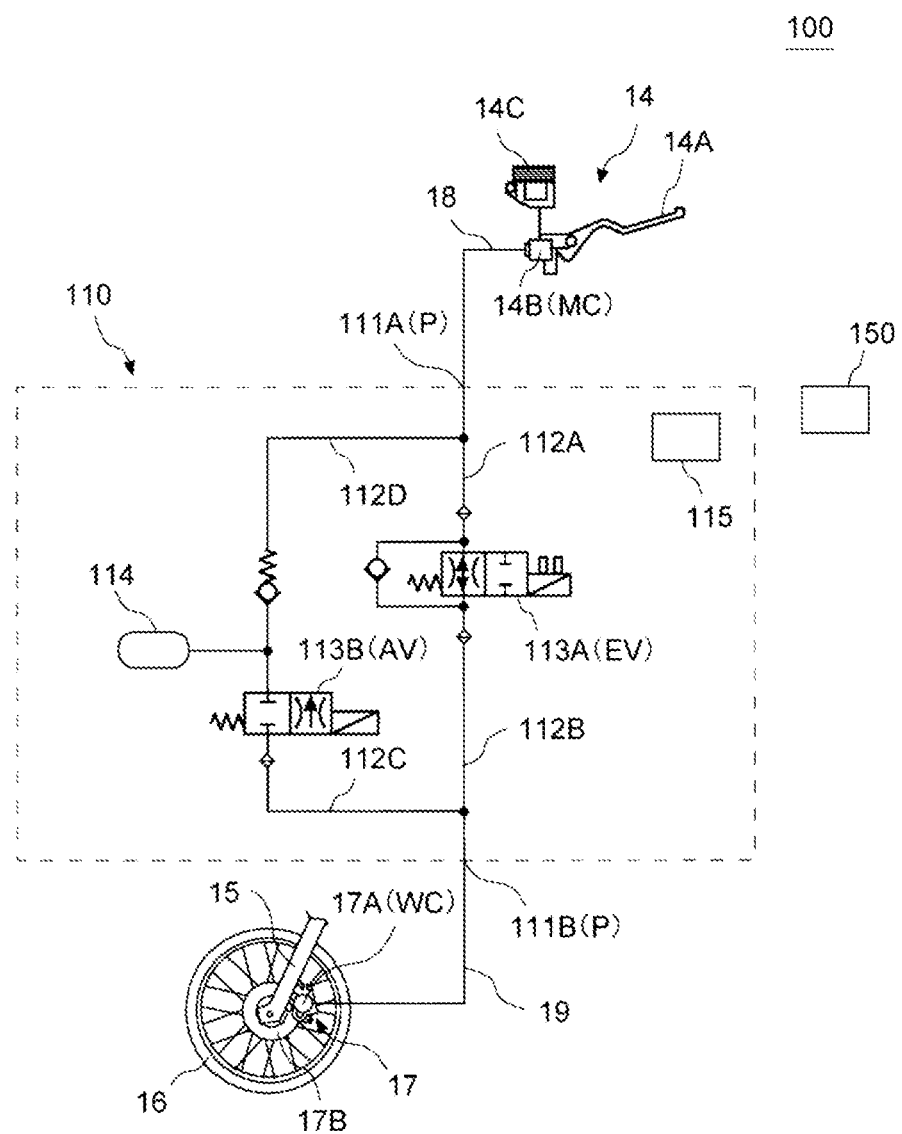
FIG. 2 is a view of the schematic configuration of the hydraulic brake system according to the first embodiment of the invention.

FIG. 2 is a view of the schematic configuration of the hydraulic brake system according to the first embodiment of the invention.

As depicted in FIG. 2, the hydraulic brake system 100 at least generates the braking force on the front wheel 16 of the bicycle 200. In particular, the hydraulic brake system 100 is preferably of a pump-less type.

The hydraulic pressure controller 110 includes a port 111A and a port 111B that are formed in a base section 121, which will be described below. The port 111A and the port 111B communicate with each other by partial channels 112A, 112B formed in the base section 121, which will be described below. In addition, an intermediate section of the partial channel 112B communicates with a partial channel 112C formed in the base section 121, which will be described below, and an intermediate section of the partial channel 112A communicates with a partial channel 112D formed in the base section 121, which will be described below. Each of the partial channels 112A, 112B, 112C, 112D corresponds to a "channel" in the invention.

The braking operation section 14 is connected to the port 111A via a brake fluid pipe 18. The braking operation section 14 has a brake lever 14A, a master cylinder 14B, and a reservoir 14C. The master cylinder 14B includes a piston section (not depicted) that moves in an interlocking manner with an operation of the brake lever 14A by the user, and is connected to an inlet side of the partial channel 112A via the brake fluid pipe 18 and the port 111A. Movement of the piston increases or reduces the hydraulic pressure of the brake fluid in the partial channel 112A. In addition, the brake fluid of the master cylinder 14B is stored in the reservoir 14C.

The front-wheel braking section 17 is connected to the port 111B via a brake fluid pipe 19. The front-wheel braking section 17 has a wheel cylinder 17A and a brake disc 17B. The wheel cylinder 17A is held by the fork 15. The wheel cylinder 17A includes a piston section (not depicted) that moves in an interlocking manner with hydraulic pressure in the brake fluid pipe 19, and is connected to an outlet side of the partial channel 112B via the brake fluid pipe 19 and the port 111B. The brake disc 17B is attached to the front wheel 16 and rotates with the front wheel 16. The front wheel 16 is braked when a brake pad (not depicted) is pressed against the brake disc 17B by movement of the piston section. Note that the front-wheel braking section 17 may not have the brake disc 17B.

In addition, the hydraulic pressure controller 110 includes an inlet valve 113A and an outlet valve 113B. The inlet valve 113A is provided between an outlet side of the partial channel 112A and an inlet side of the partial channel 112B and opens and closes between the partial channel 112A and the partial channel 112B. The outlet valve 113B is provided between an outlet side of the partial channel 112C and an inlet side of the partial channel 112D and opens and closes between the partial channel 112C and the partial channel 112D. The hydraulic pressure of the brake fluid is controlled by opening/closing operations of the inlet valve 113A and the outlet valve 113B. Each of the inlet valve 113A and the outlet valve 113B corresponds to a "valve" of the invention and opens and closes the "channel" of the invention.

The inlet valve 113A is, for example, an electromagnetic valve that is opened when not being energized, and allows a bidirectional flow of the brake fluid when not being energized. When the inlet valve 113A is energized, the inlet valve 113A is brought into a closed state by a solenoid and thereby blocks the flow of the brake fluid.

The outlet valve 113B is, for example, an electromagnetic valve that is closed when not being energized, and blocks the flow of the brake fluid when not being energized. When the outlet valve 113B is energized, the outlet valve 113B is brought into an opened state by a solenoid and thereby allows the flow of the brake fluid.

The hydraulic pressure controller 110 includes an accumulator 114. The accumulator 14 is connected to an intermediate section of the partial channel 112D, and the brake fluid that passes through the outlet valve 113B is stored therein.

Furthermore, the hydraulic pressure controller 110 includes a control section 115 (an ECU). Note that the control section 115 may integrally be disposed with members other than the control section 115 of the hydraulic pressure controller 110 in the bicycle 200 or may separately be disposed therefrom. In addition, each section of the control section 115 may separately be disposed. A part or a whole of the control section 115 may be constructed of a microcomputer, a microprocessor, or the like, for example, may be constructed of a member in which firmware and the like can be updated, or may be a program module or the like that is executed by a command from a CPU or the like.

The control section 115 controls the hydraulic pressure of the brake fluid, that is, the braking force of the front wheel 16 by controlling the opening/closing operations of the inlet valve 113A and the outlet valve 113B in the hydraulic pressure controller 110.

For example, in the case where locking or possible locking of the front wheel 16 is detected by a sensor (not depicted) that detects a rotational speed of the front wheel 16 during braking by the operation of the brake lever 14A by the user, the control section 115 initiates anti-lock brake control.

Once initiating the anti-lock brake control, the control section 115 brings the inlet valve 113A into an energized state for closing and blocks a supply of the brake fluid to the wheel cylinder 17A, so as to stop an increase in the hydraulic pressure of the brake fluid in the wheel cylinder 17A. Meanwhile, the control section 115 brings the outlet valve 113B into an energized state for opening and allows the flow of the brake fluid from the wheel cylinder 17A to the accumulator 114, so as to reduce the hydraulic pressure of the brake fluid in the wheel cylinder 17A. In this way, locking of the front wheel 16 is canceled or avoided. When determining that the hydraulic pressure of the brake fluid in the wheel cylinder 17A is reduced to a specified value, the control section 115 brings the outlet valve 113B into an unenergized state for closing and brings the inlet valve 113A into an unenergized state for opening for a short time period, so as to increase the hydraulic pressure of the brake fluid in the wheel cylinder 17A. The control section 115 may increase/reduce the hydraulic pressure of the wheel cylinder 17A only once or may do so for plural times.

When the anti-lock brake control is terminated and the brake lever 14A returns, the inside of the master cylinder 14B is brought into an atmospheric pressure state, and the brake fluid in the wheel cylinder 17A returns. In addition, due to generation of this atmospheric pressure state, the brake fluid in the accumulator 114 returns to the partial channel 112A.

<Configuration of the Hydraulic Pressure Controller>

A description will be made on a configuration of the hydraulic pressure controller in the hydraulic brake system according to the first embodiment.

Figure 3:
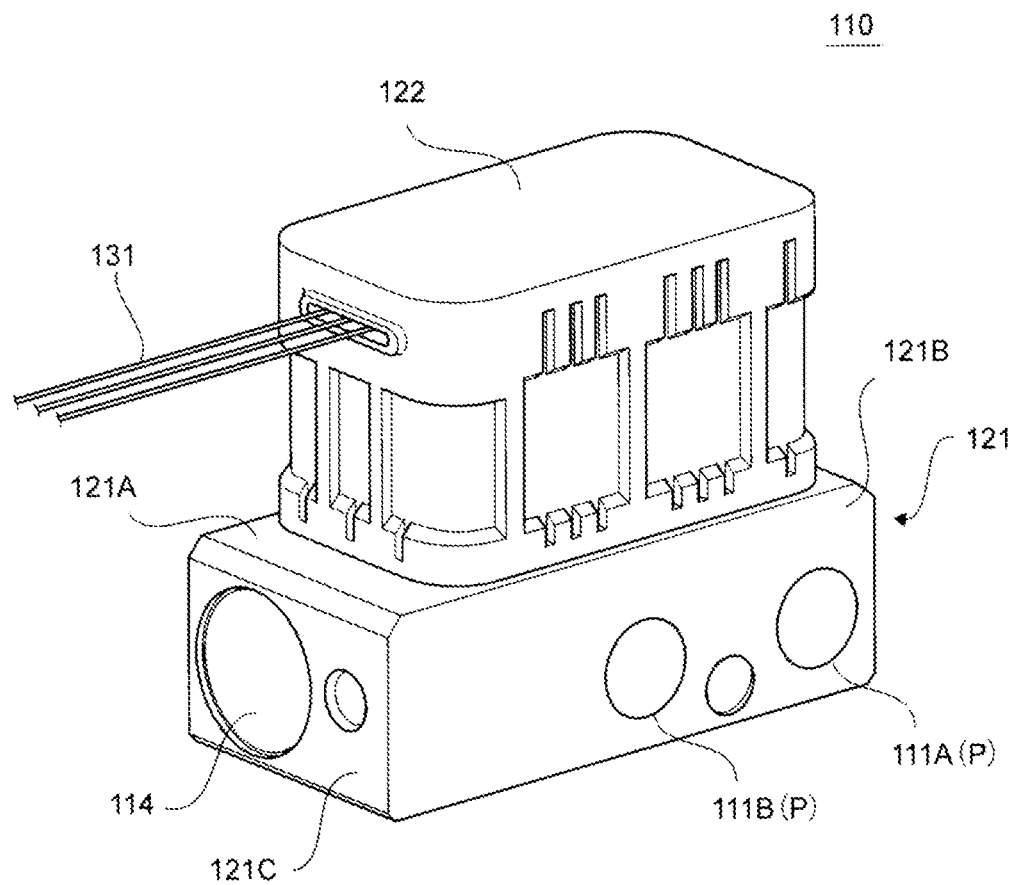
FIG. 3 is a perspective view of a configuration of a hydraulic pressure controller in the hydraulic brake system according to the first embodiment of the invention.
Figure 4:
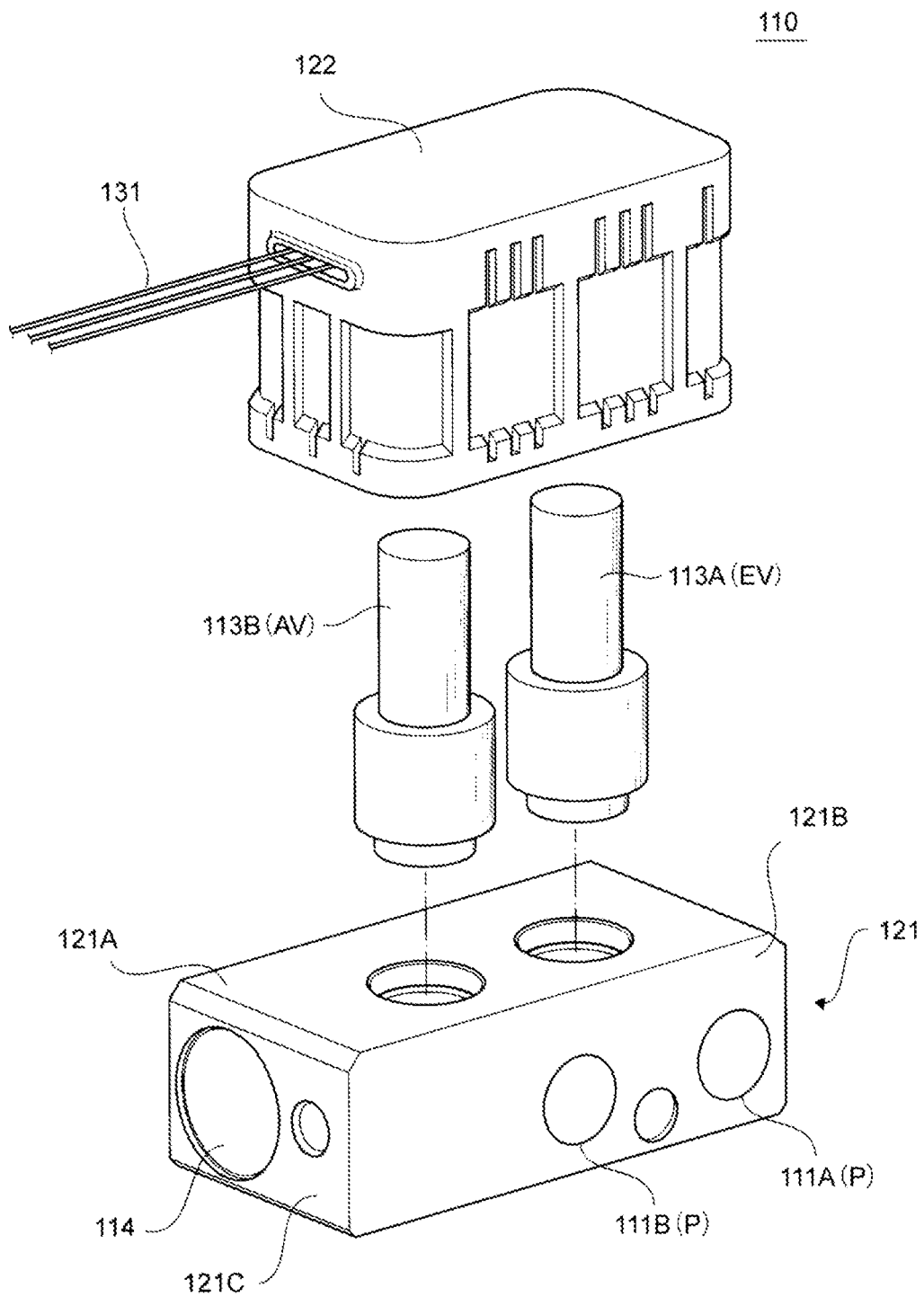
FIG. 4 is an exploded perspective view of the configuration of the hydraulic pressure controller in the hydraulic brake system according to the first embodiment of the invention.

FIG. 3 is a perspective view of the configuration of the hydraulic pressure controller in the hydraulic brake system according to the first embodiment of the invention. FIG. 4 is an exploded perspective view of the configuration of the hydraulic pressure controller in the hydraulic brake system according to the first embodiment of the invention.

As depicted in FIG. 3 and FIG. 4, the hydraulic pressure controller 110 includes: the base section 121 that is formed with the channels; and a valve case 122. The inlet valve 113A and the outlet valve 113B are attached to the base section 121 and are accommodated in the valve case 122.

The base section 121 is, for example, a member made of metal such as an aluminum alloy and has a first surface 121A, a second surface 121B, and a third surface 121C, two each of which intersect with each other at right angles. The inlet valve 113A and the outlet valve 113B are attached to the first surface 121A, the ports 111A, 111B are formed in the second surface 121B, and the accumulator 114 is attached to the third surface 121C. With such a configuration, size and weight of the hydraulic pressure controller 110 are reduced.

The valve case 122 is made of a resin, for example. A power supply line 131 from the power supply unit 150 penetrates an opening that is formed in the valve case 122, and is electrically connected to the control section 115 on the inside of the valve case 122. The inlet valve 113A and the outlet valve 113B are electrically connected to the control section 115.

<Mode of Application of the Hydraulic Pressure Controller in the Hydraulic Brake System to the Bicycle>

A description will be made on a mode of application of the hydraulic pressure controller in the hydraulic brake system according to the first embodiment to the bicycle.

Figure 5:
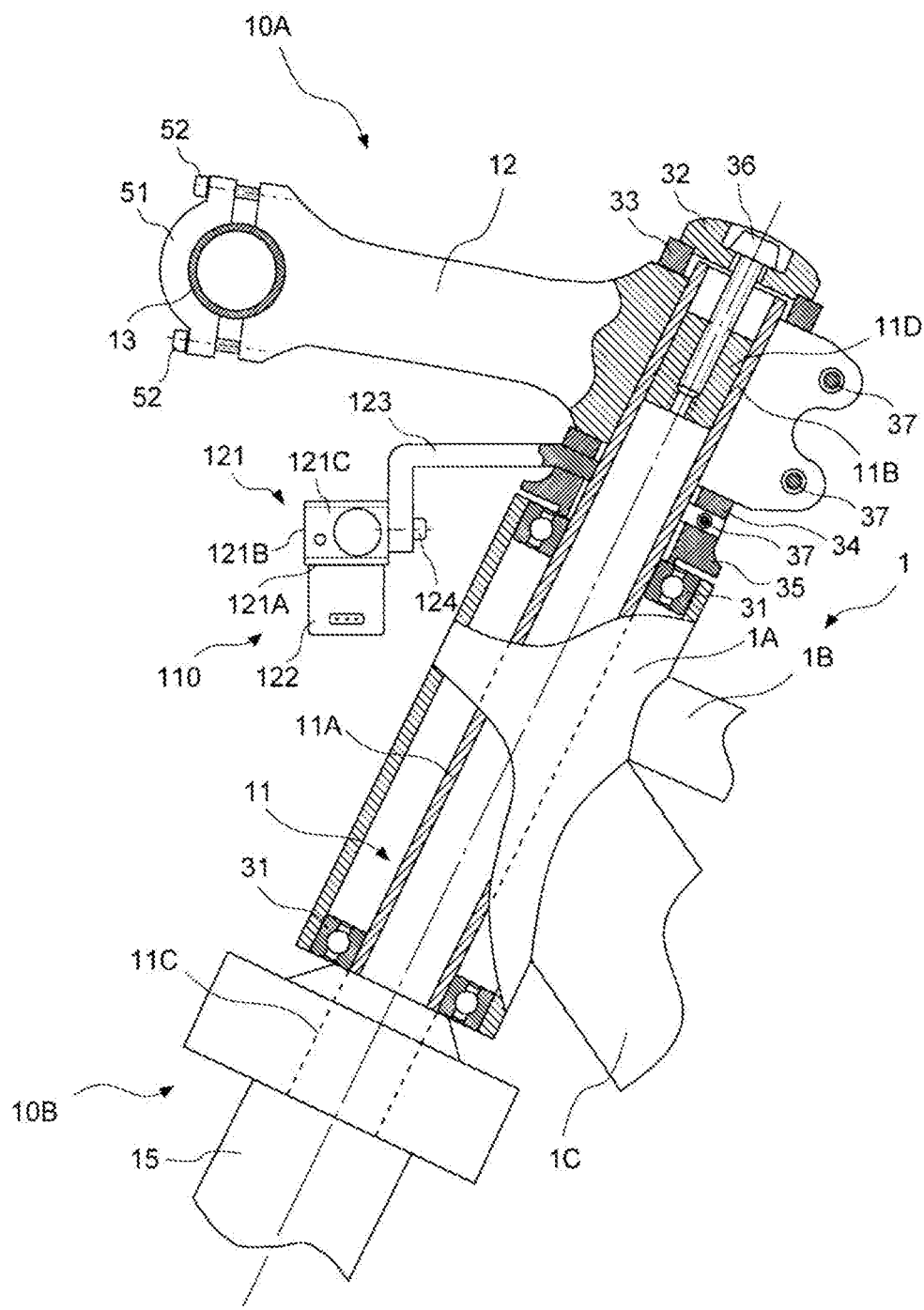
FIG. 5 is a partial cross-sectional view of the hydraulic brake system according to the first embodiment of the invention and the bicycle, to which the hydraulic brake system is applied, in a periphery of the hydraulic pressure controller.

FIG. 5 is a partial cross-sectional view of the hydraulic brake system according to the first embodiment of the invention and the bicycle, to which the hydraulic brake system is applied, in the periphery of the hydraulic pressure controller.

As depicted in FIG. 5, the steering column 11 includes: a central section 11A that is axially supported by the head tube 1A of the frame 1; an upper projected section 11B that is projected to an upper side of the central section 11A; and a lower projected section 11C that is projected to a lower side of the central section 11A. The central section 11A is axially supported by the head tube 1A via bearings 31. Members of the upper turning section 10A other than the upper projected section 11B are held by the upper projected section 11B. Members of the lower turning section 10B other than the lower projected section 11C are held by the lower projected section 11C.

The handle stem 12 is a so-called ahead stem, for example, and the upper turning section 10A includes a pressurizing member 32, a pressing member 33, a spacer member 34, and an abutting member 35. The pressing member 33, the handle stem 12, the spacer member 34, and the abutting member 35 are sequentially disposed between the pressurizing member 32 and the bearing 31. The spacer member 34 is used to adjust height of the handlebar 13. Plural units of the spacer member 34 may be provided, or the spacer member 34 may not be provided.

The steering column 11 has a joint section 11D, and the joint section 11D is fixed to the inside of the upper projected section 11B by press-fitting or the like. When a screw 36 for joining the pressurizing member 32 and the joint section 11D is fastened, the pressurizing member 32 is pressed against an inner wheel of the bearing 31 via the pressing member 33, the handle stem 12, the spacer member 34, and the abutting member 35. In this way, the bearing 31 is pressurized. In other words, the pressurizing member 32 pressurizes the bearing 31 when being joined to a tip of the upper projected section 11B of the steering column 11 by the screw 36.

Meanwhile, the handle stem 12 has such a shape that a rear section of a through hole, through which the upper projected section 11B of the steering column 11 is inserted, is cut out, and a screw 37 that passes through the cutout portion is fastened in a state where the screw 36 is fastened. In this way, coupling of the handle stem 12 to the steering column 11 is secured.

The hydraulic pressure controller 110 includes a coupling section 123 that couples the base section 121 to the upper turning section 10A. The coupling section 123 couples the base section 121 to the upper turning section 10A in a state where the hydraulic pressure controller 110, particularly, the base section 121 is located between the handle stem 12 and the front wheel 16. The entire hydraulic pressure controller 110 is further preferably coupled in a state of being located between the handle stem 12 and the front wheel 16. Note that the base section 121 and the coupling section 123 may be constructed of a single member.

A through hole is formed at one end of the coupling section 123, and the end is disposed between the spacer member 34 and the abutting member 35 in a state where the upper projected section 11B of the steering column 11 is inserted through the through hole. In other words, the coupling section 123 is disposed between the handle stem 12 and the bearing 31 and contributes to pressurization of the bearing 31 by the pressurizing member 32. Note that the coupling section 123 has such a shape that a rear section of the through hole is cut out, and the screw 37 that passes through the cutout portion is fastened in the state where the screw 36 is fastened. In this way, coupling of the coupling section 123 to the steering column 11 is secured.

The one end of the coupling section 123 preferably has the same thickness as the spacer member 34. With such a configuration, in the cases where the hydraulic pressure controller 110 is attached to the bicycle 200 that is not originally provided with the hydraulic pressure controller 110 and where one of the spacer members 34 is removed to attach the coupling section 123, for example, the height of the handlebar 13 does not change. Thus, the user can easily adjust the height of the handlebar 13.

In addition, the other end of the coupling section 123 is bent downward, and a back surface of the second surface 121B of the base section 121 in the hydraulic pressure controller 110 is coupled to a front surface of the bent portion by a screw 124. In other words, the coupling section 123 couples the base section 121 to the upper turning section 10A in a state where the surface of the base section 121, in which the ports 111A, 111B are formed, is located in the front in a traveling direction of the bicycle 200. With such a configuration, the brake fluid pipes 18, 19 can be connected to the front surface of the base section 121. Furthermore, the coupling section 123 couples the base section 121 to the upper turning section 10A in a state where the base section 121 is located on an upper side of the valve case 122. With such a configuration, design can be improved by reducing arrangement length of the brake fluid pipes 18, 19.

The handlebar 13 is held between a recessed section at a tip of the handle stem 12 and a recessed section of a handle clamp 51 when the handle clamp 51 is joined to the tip of the handle stem 12 by screws 52. In other words, the handlebar 13 is held by the screws 52, and the upper turning section 10A includes: the screws 52 that make the handle stem 12 hold the handlebar 13; and the handle clamp 51 that is joined to the handle stem 12 by the screws 52 in a state of interposing the handlebar 13 between the handle clamp 51 and the handle stem 12.

<Effects of the Hydraulic Brake System>

A description will be made on effects of the hydraulic brake system according to the first embodiment.

The hydraulic pressure controller 110 includes: the base section 121; the valves (the inlet valve 113A, the outlet valve 113B) that are attached to the base section 121 and open and close the channels (the partial channels 112A, 112B, 112C, 112D) formed therein; and the coupling section 123 that couples the base section 121 to the bicycle 200, and the coupling section 123 is coupled to the turning section 10 that turns about an axis of the head tube 1A. Accordingly, for example, when the user turns the handlebar 13 for an operation, the brake lever 14A, the front-wheel braking section 17, and the brake fluid pipes 18, 19 integrally turn, and generation of the stress on the brake fluid pipes 18, 19 is thereby suppressed. Thus, in the case where the hydraulic brake system 100, on which the influence of the stress generated in a brake transmission path is significant, is adopted for the bicycle 200, control of the braking force is suppressed from becoming unstable.

Preferably, the coupling section 123 is coupled to the upper turning section 10A that turns on the upper side of the head tube 1A. Accordingly, compared to a case where the coupling section 123 is coupled to the lower turning section 10B that turns on the lower side of the head tube 1A, damage on the hydraulic pressure controller 110 caused by a flying stone or the like can be suppressed.

Preferably, the upper turning section 10A includes the pressurizing member 32 that is joined to the tip of the upper projected section 11B of the steering column 11 by the screw and pressurizes the bearing 31, and the coupling section 123 is coupled between the pressurizing member 32 and the bearing 31. Thus, necessity of adding a complex mechanism, such as a fastening mechanism, for coupling the coupling section 123 to the upper turning section 10A can be reduced.

Preferably, the handle stem 12 is coupled between the pressurizing member 32 and the bearing 31, and the coupling section 123 is coupled between the handle stem 12 and the bearing 31. Thus, the hydraulic pressure controller 110 can be protected by positioning the handle stem 12 on the upper side of the hydraulic pressure controller 110.

Preferably, the hydraulic pressure controller 110 (particularly, the base section 121) is located between the handle stem 12 and the front wheel 16. Thus, the hydraulic pressure controller 110 (particularly, the base section 121) is suppressed from becoming the primary ground contact portion of the bicycle 200 and thus from being damaged during falling down.

Preferably, the turning section 10 turns only at such an angle that the hydraulic pressure controller 110 (particularly, the base section 121) does not abut against the frame 1. Thus, the damage on the hydraulic pressure controller 110 (particularly, the base section 121) due to the operation by the user or falling down is suppressed.

Preferably, the brake fluid pipes 18, 19 are connected to the front surface of the base section 121. Thus, workability at a time of connecting the brake fluid pipes 18, 19 to the hydraulic pressure controller 110 is improved.

<Modified Example>

Figure 6:
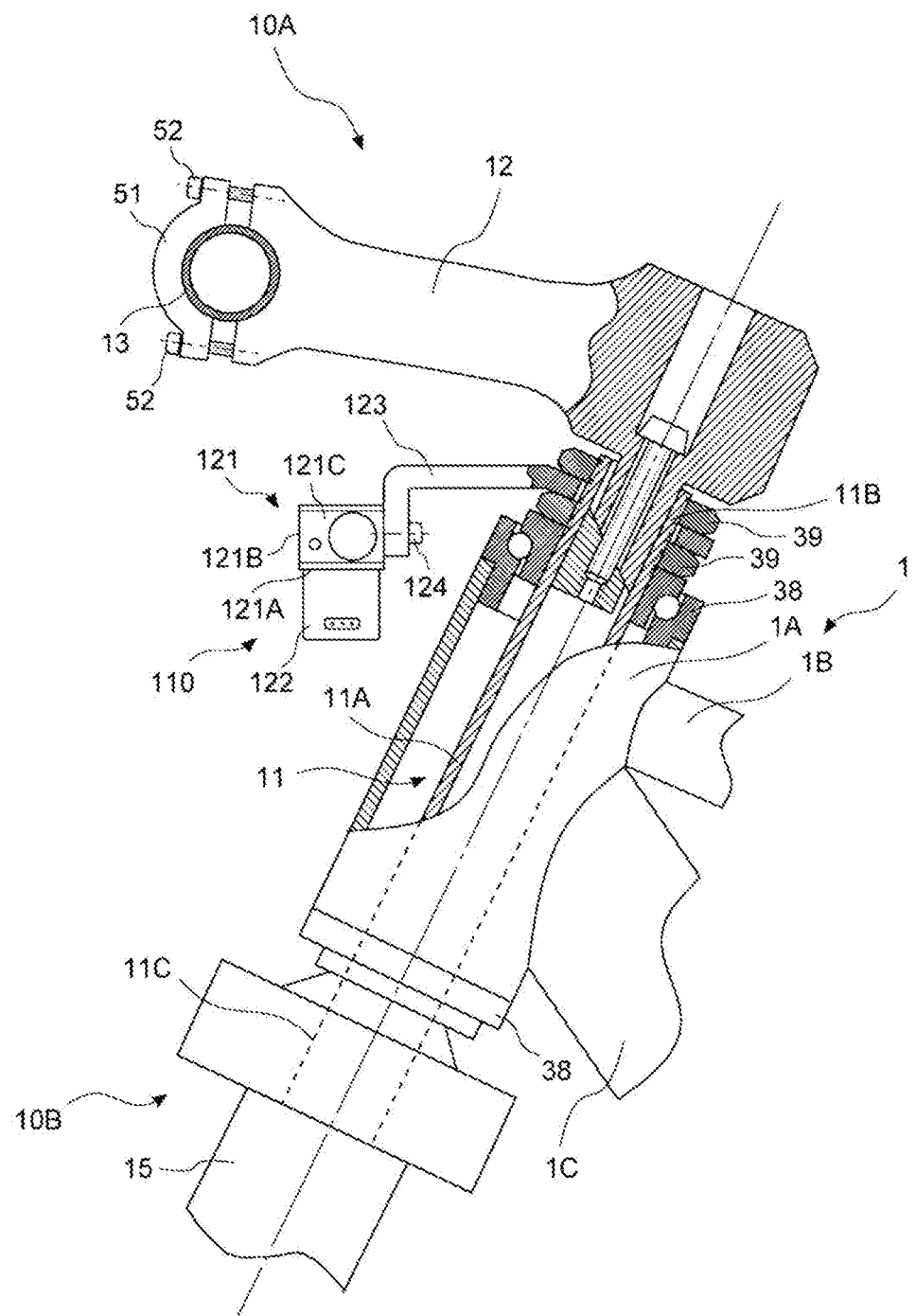
FIG. 6 is a partial cross-sectional view of a hydraulic brake system according to a modified example of the first embodiment of the invention and a bicycle, to which the hydraulic brake system is applied, in a periphery of a hydraulic pressure controller.

FIG. 6 is a partial cross-sectional view of a hydraulic brake system according to a modified example of the first embodiment of the invention and a bicycle, to which the hydraulic brake system is applied, in a periphery of a hydraulic pressure controller.

As depicted in FIG. 6, the handle stem 12 may be a so-called quill stem. In other words, the handle stem 12 is configured to be fixed to the inside of the upper projected section 11B of the steering column 11 in a detachable manner. In addition, plural nuts 39 are joined to a female screw that is formed at the tip of the upper projected section 11B of the steering column 11, and the steering column 11 is thereby axially supported by the head tube 1A via a pressurized bearing 38.

The through hole is formed at the one end of the coupling section 123, and the one end is disposed between the plural nuts 39 in the state where the upper projected section 11B of the steering column 11 is inserted through the through hole. In other words, the coupling section 123 is coupled to the upper projected section 11B of the steering column 11 by the plural nuts 39. Even with such a configuration, the similar effects as those described above are exhibited.

Second Embodiment

A description will hereinafter be made on a hydraulic brake system according to a second embodiment.

Note that a description that overlaps the description on the hydraulic brake system according to the first embodiment will appropriately be omitted. In addition, the following description will be made on a case where the handle stem 12 is the so-called ahead stem; however, the handle stem 12 may be of another type.

<Mode of Application of the Hydraulic Pressure Controller in the Hydraulic Brake System to the Bicycle>

A description will be made on a mode of application of a hydraulic pressure controller in the hydraulic brake system according to the second embodiment to a bicycle.

Figure 7:
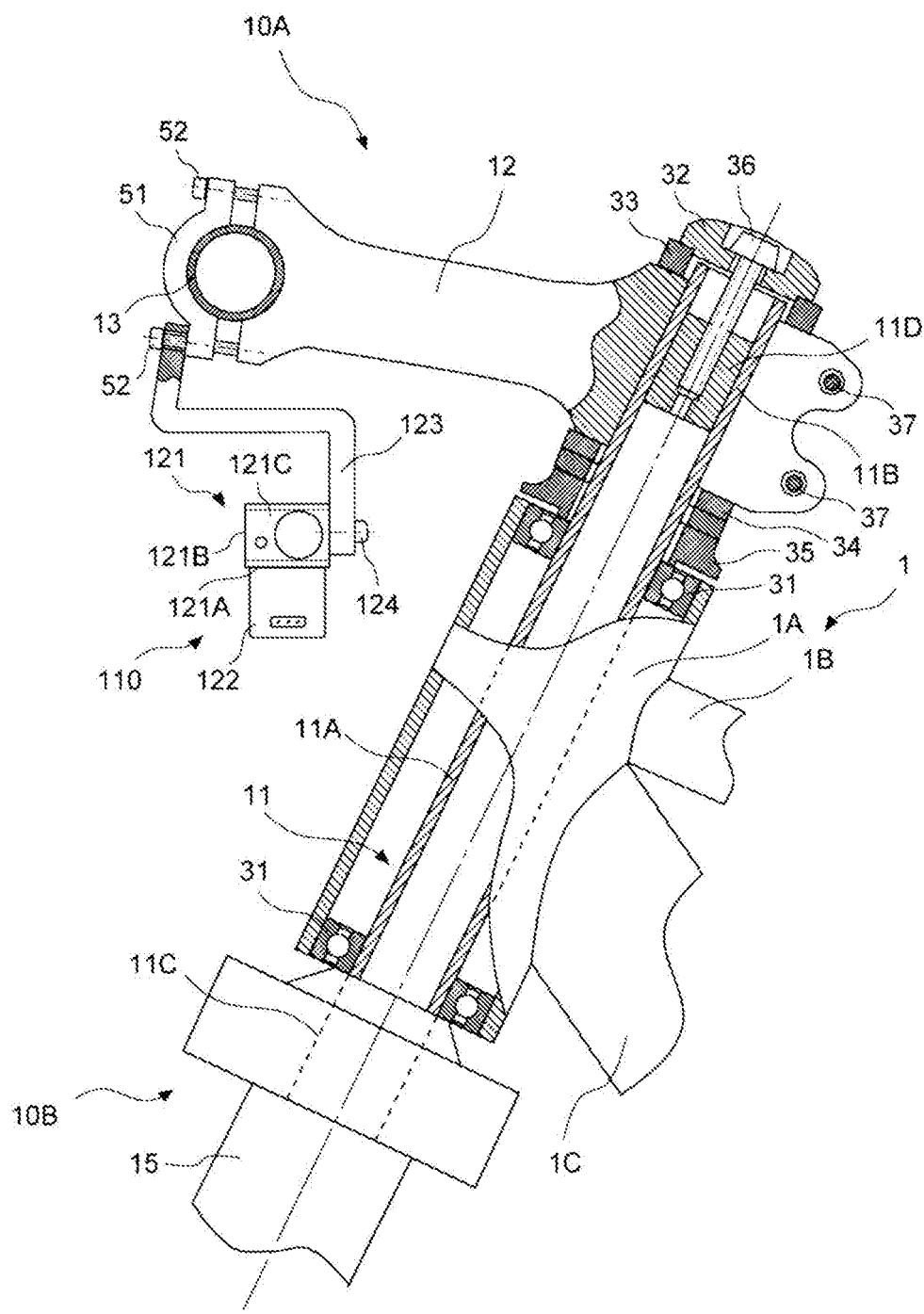
FIG. 7 is a partial cross-sectional view of a hydraulic brake system according to a second embodiment of the invention and a bicycle, to which the hydraulic brake system is applied, in a periphery of a hydraulic pressure controller.

FIG. 7 is a partial cross-sectional view of the hydraulic brake system according to the second embodiment of the invention and the bicycle, to which the hydraulic brake system is applied, in a periphery of the hydraulic pressure controller.

As depicted in FIG. 7, a through hole is formed at one end of the coupling section 123, and the end is coupled by the screw 52 that makes the handle stem 12 hold the handlebar 13. In other words, the coupling section 123 is fastened with the handle clamp 51 by the screw 52 in a state where the handle clamp 51 is interposed between the coupling section 123 and the handle stem 12.

<Effects of the Hydraulic Brake System>

A description will be made on effects of the hydraulic brake system according to the second embodiment.

Preferably, the upper turning section 10A includes the screws 52 that make the handle stem 12 hold the handlebar 13, and the coupling section 123 is coupled to the bicycle 200 by the screw 52. Thus, the necessity of adding the complex mechanism, such as the fastening mechanism, for coupling the coupling section 123 to the upper turning section 10A can be reduced.

Preferably, the upper turning section 10A includes the handle clamp 51 that is joined to the handle stem 12 by the screws 52 in the state of interposing the handlebar 13 between the handle clamp 51 and the handle stem 12, and the coupling section 123 is fastened with the handle clamp 51 by the screw 52. Thus, the hydraulic pressure controller 110 can be attached without detaching the handle stem 12. Therefore, the workability for attachment is improved.

Preferably, the handle clamp 51 is fastened together between the coupling section 123 and the handle stem 12. Thus, the hydraulic pressure controller 110 can be attached without detaching the handle clamp 51. Therefore, the workability for attachment is improved. In addition, the hydraulic pressure controller 110 can be attached without canceling holding of the handlebar 13. Thus, necessity of adjusting a position of the handlebar 13 after the attachment thereof is suppressed.

<Modified Example>

Figure 8:
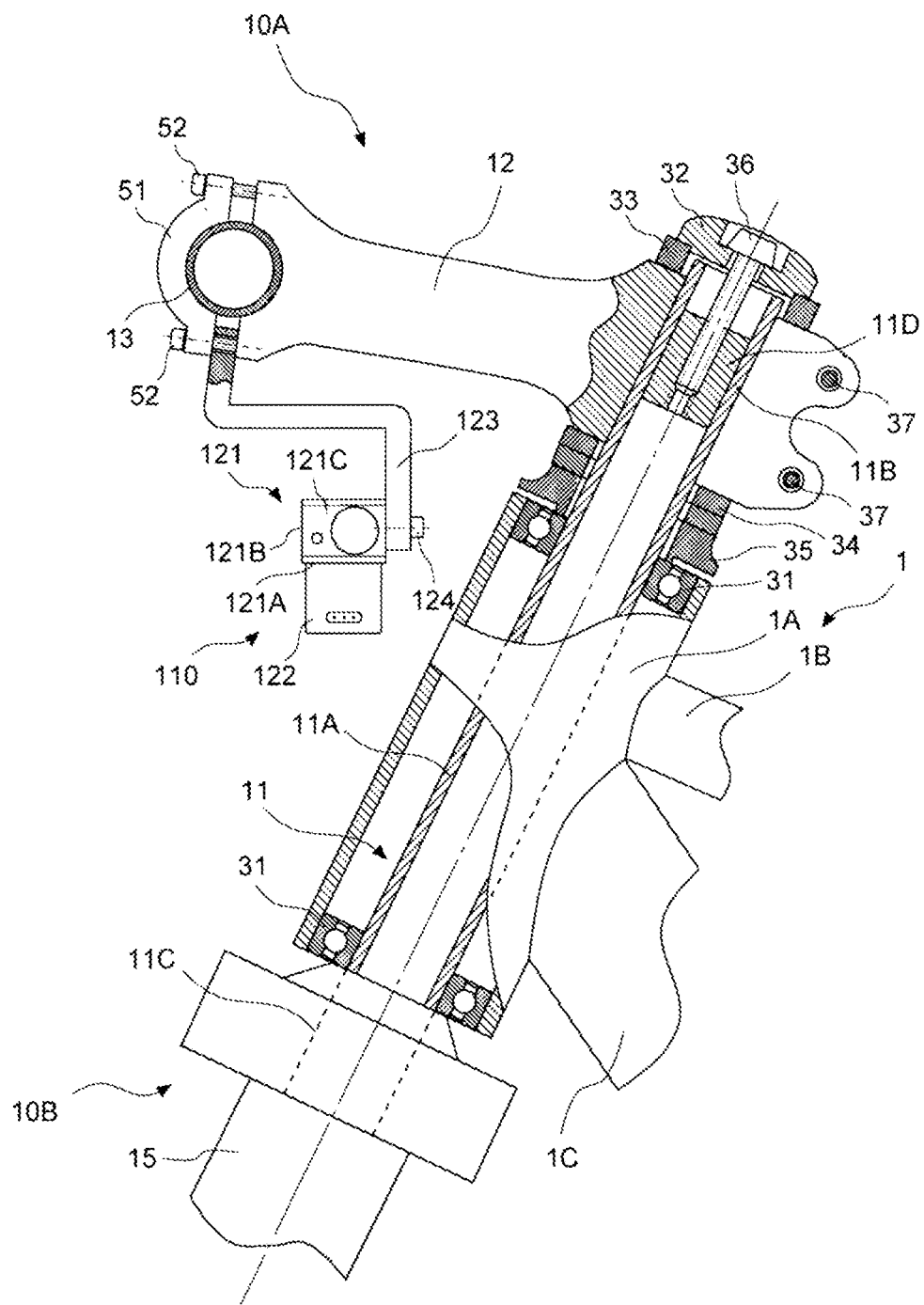
FIG. 8 is a partial cross-sectional view of a hydraulic brake system according to a modified example of the second embodiment of the invention and a bicycle, to which the hydraulic brake system is applied, in a periphery of a hydraulic pressure controller.

FIG. 8 is a partial cross-sectional view of a hydraulic brake system according to a modified example of the second embodiment of the invention and a bicycle, to which the hydraulic brake system is applied, in a periphery of a hydraulic pressure controller.

As depicted in FIG. 8, the coupling section 123 may be fastened together between the handle clamp 51 and the handle stem 12. Even with such a configuration, the similar effects as those described above are exhibited. In addition, the coupling section 123 can firmly be coupled to the upper turning section 10A.

Figure 9:
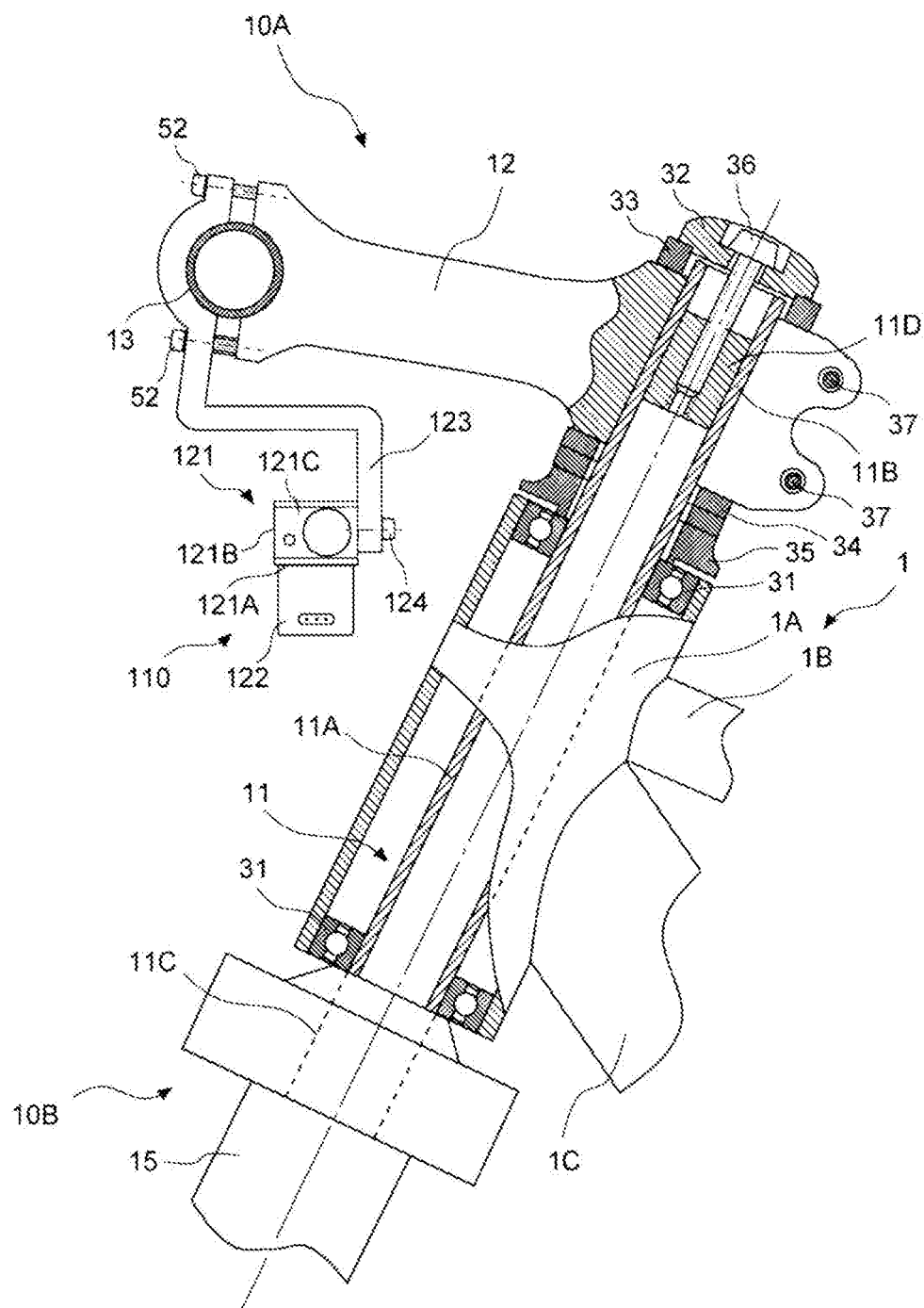
FIG. 9 is a partial cross-sectional view of a hydraulic brake system according to a modified example of the second embodiment of the invention and a bicycle, to which the hydraulic brake system is applied, in a periphery of a hydraulic pressure controller.

FIG. 9 is a partial cross-sectional view of a hydraulic brake system according to a modified example of the second embodiment of the invention and a bicycle, to which the hydraulic brake system is applied, in a periphery of a hydraulic pressure controller.

As depicted in FIG. 9, the coupling section 123 and the handle clamp 51 may be constructed of a single member. In other words, the coupling section 123 may have a function of the handle clamp 51 and may be joined to the handle stem 12 by the screws 52 in the state of interposing the handlebar 13 between the coupling section 123 and the handle stem 12. Even with such a configuration, the similar effects as those described above are exhibited. In addition, the coupling section 123 can firmly be coupled to the upper turning section 10A, and the design is improved.

Third Embodiment

A description will hereinafter be made on a hydraulic brake system according to a third embodiment.

Note that a description that overlaps the descriptions on the hydraulic brake systems according to the first embodiment and the second embodiment will appropriately be omitted. In addition, a description will hereinafter be made on a case where a mode of application of the hydraulic pressure controller 110 in the hydraulic brake system 100 to the bicycle 200 is the same as that of the first embodiment; however, the mode may be the same as that of the second embodiment.

<Mode of Application of the Hydraulic Pressure Controller in the Hydraulic Brake System to the Bicycle>

A description will be made on the mode of the application of the hydraulic pressure controller in the hydraulic brake system according to the third embodiment to the bicycle.

Figure 10:
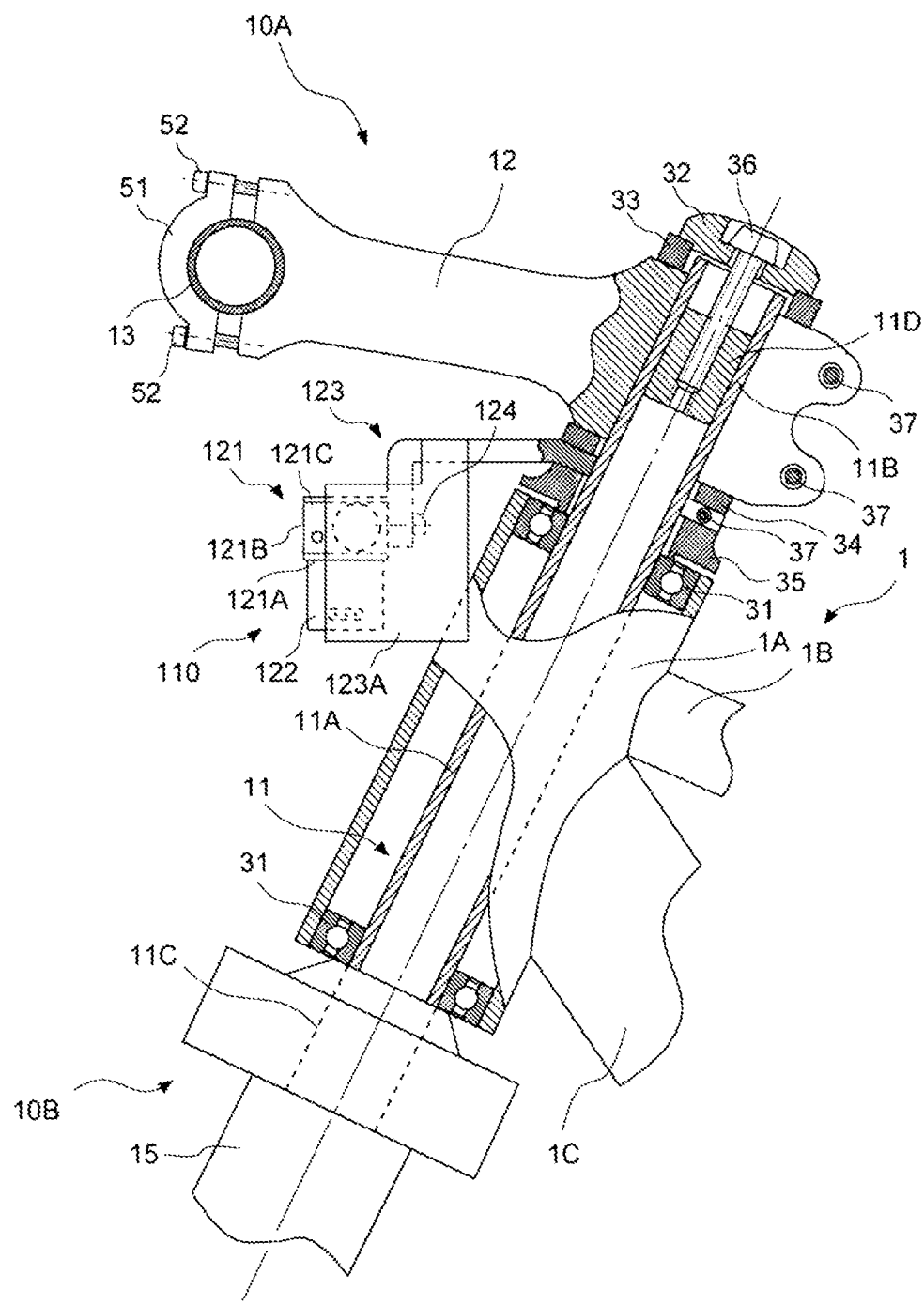
FIG. 10 is a partial cross-sectional view of a hydraulic brake system according to a third embodiment of the invention and a bicycle, to which the hydraulic brake system is applied, in a periphery of a hydraulic pressure controller.

FIG. 10 is a partial cross-sectional view of the hydraulic brake system according to the third embodiment of the invention and the bicycle, to which the hydraulic brake system is applied, in a periphery of the hydraulic pressure controller.

As depicted in FIG. 10, the coupling section 123 includes a stopper section 123A that at least covers a part of a side of the hydraulic pressure controller 110 (particularly, the base section 121). The stopper section 123A is disposed on the trajectory of turning of the hydraulic pressure controller 110 (particularly, the base section 121). During turning of the turning section 10, the stopper section 123A abuts against the frame 1 before the hydraulic pressure controller 110 (particularly, the base section 121) does so, and thereby restricts turning of the turning section 10. In other words, the turning section 10 turns only at such an angle that the hydraulic pressure controller 110 (particularly, the base section 121) does not abut against the frame 1. Note that the stopper section 123A and portions of the coupling section 123 other than the stopper section 123A may be constructed of different members. In addition, the stopper section 123A is further preferably projected to all of the side of the hydraulic pressure controller 110. Furthermore, the stopper section 123A is even further preferably projected to the front of the hydraulic pressure controller 110.

<Effects of the Hydraulic Brake System>

A description will be made on effects of the hydraulic brake system according to the third embodiment.

Preferably, the coupling section 123 includes the stopper section 123A that restricts turning of the turning section 10. Thus, for example, even in the case where the hydraulic pressure controller 110 is applied to the bicycle 200 in which turning of the turning section 10 is not restricted, or the like, the hydraulic pressure controller 110 (particularly, the base section 121) is suppressed from abutting against the frame 1 and thus from being damaged due to the operation by the user or falling down.

<Modified Example>

Figure 11:
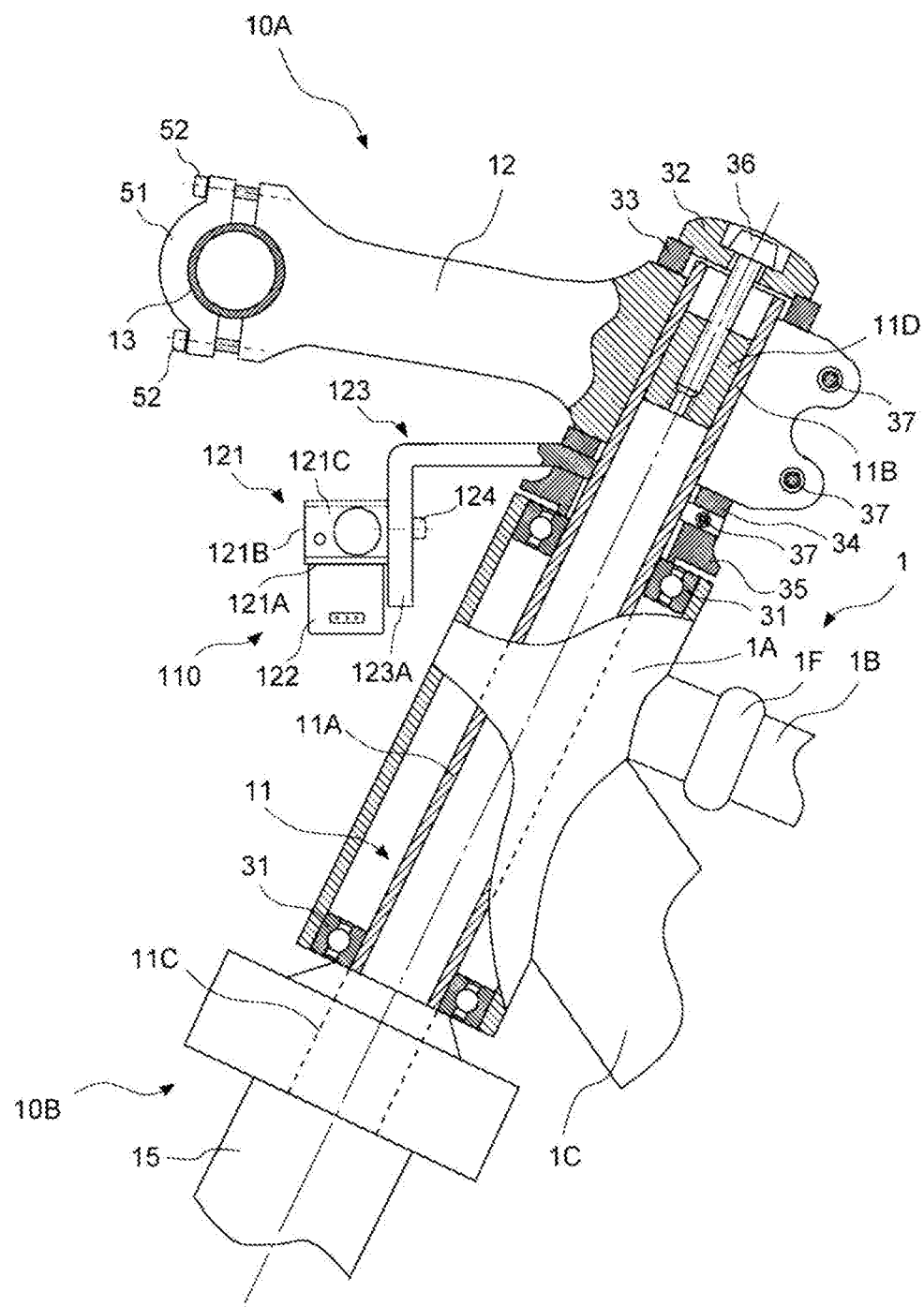
FIG. 11 is a partial cross-sectional view of a hydraulic brake system according to a modified example of the third embodiment of the invention and a bicycle, to which the hydraulic brake system is applied, in a periphery of a hydraulic pressure controller.

FIG. 11 is a partial cross-sectional view of a hydraulic brake system according to a modified example of the third embodiment of the invention and a bicycle, to which the hydraulic brake system is applied, in a periphery of a hydraulic pressure controller.

As depicted in FIG. 11, an elastic section 1F, such as rubber, may be disposed in a region of the frame 1 that is located on a trajectory of turning of the coupling section 123. An outer circumferential surface of the elastic section 1F is projected to a side of the frame 1. With such a configuration, during turning of the turning section 10, the coupling section 123 abuts against the elastic section 1F before the hydraulic pressure controller 110 abuts against the frame 1. In other words, a side section of the coupling section 123 functions as the stopper section 123A that restricts turning of the turning section 10. Even with such a configuration, the similar effects as those described above are exhibited.

The description has been made so far on the first embodiment to the third embodiment. However, the invention is not limited to the description of each of the embodiments. For example, a whole or a part of each of the embodiments may be combined.

REFERENCE SIGNS LIST

1: Frame
1A: Head tube
1B: Top tube
1C: Down tube
1D: Seat tube
1E: Stay
1F: Elastic section
10: Turning section
10A: Upper turning section
10B: Lower turning section
11: Steering column
11A: Central section
11B: Upper projected section
11C: Lower projected section
11D: Joint section
12: Handle stem
13: Handlebar
14: Braking operation section
14A: Brake lever
14B: Master cylinder
14C: Reservoir
15: Fork
16: Front wheel
17: Front-wheel braking section
17A: Wheel cylinder
17B: Brake disc
18, 19: Brake fluid pipe
21: Saddle
22: Pedal
23: Rear wheel
24: Rear-wheel braking section
31, 38: Bearing
32: Pressurizing member
33: Pressing member
34: Spacer member
35: Abutting member
36, 37, 52, 124: Screw
39: Nut
51: Handle clamp
100: Hydraulic brake system
110: Fluid pressure controller
111A, 111B: Port
112A, 112B, 112C, 112D: Partial channel
113A: Inlet valve
113B: Outlet valve
114: Accumulator
115: Control section
121: Base section
121A: First surface
121B: Second surface
121C: Third surface
122: Valve case
123: Coupling section
123A: Stopper section
131: Power supply line
150: Power supply unit
200: Bicycle

What is claimed is:

1. A hydraulic pressure controller for controlling hydraulic pressure of a brake fluid that is at least supplied to a front-wheel braking section of a bicycle, the hydraulic pressure controller comprising:
a base section that is formed with a channel, through which the brake fluid flows, therein;
a turning section including an upper turning section that turns on an upper side of a head tube; and a lower turning section that turns on a lower side of the head tube, the turning section being configured to turn about an axis of the head tube;
a valve that is attached to the base section and opens and closes the channel; and
a coupling section configured to couple the base section to the bicycle,
wherein the upper turning section includes: an upper projected section of a steering column that is axially supported by the head tube via a bearing, the upper projected section being projected to the upper side of the head tube; a handle stem that is held by the upper projected section; and a handlebar that is held by the handle stem,
wherein the coupling section is configured to be coupled to the upper turning section,
wherein the upper turning section further includes a pressurizing member that is joined to a tip of the upper projected section by a screw and pressurizes the bearing, and
wherein the coupling section is configured to be coupled between the pressurizing member and the bearing.

2. The hydraulic pressure controller according to claim 1, wherein the turning section turns only at such an angle that the base section does not abut against a frame of the bicycle.

3. The hydraulic pressure controller according to claim 2, wherein the coupling section includes a stopper section that restricts turning of the turning section.

4. A hydraulic brake system comprising:
the hydraulic pressure controller according to claim 1.

5. A bicycle comprising:
the hydraulic brake system according to claim 4.

6. The hydraulic pressure controller according to claim 1, wherein the base section is located between the handle stem and a front wheel of the bicycle.

7. The hydraulic pressure controller according to claim 1, wherein a brake fluid pipe that communicates with the channel is connected to a front surface of the base section.

8. A bicycle (200) comprising:
a hydraulic brake system (100), the hydraulic brake system (100) including a master cylinder (14B), a wheel cylinder (17A) of a front-wheel braking section (17), a brake fluid pipe (18), and a hydraulic pressure controller (110) for controlling hydraulic pressure of a brake fluid that is at least supplied to the wheel cylinder (17A), the hydraulic pressure controller (110) being connected with the master cylinder (14B) via the brake fluid pipe (18) and to the wheel cylinder (17A) via a further fluid pipe (19), and comprising:
a base section (121) that is formed with a channel (112A-D), through which the brake fluid flows, therein;
a valve (113A, 113B) that is attached to the base section (121) and opens and closes the channel (112A-D); and
a coupling section (123) that couples the base section (121) to the bicycle (200),
wherein the coupling section (123) is coupled to a turning section (10) of the bicycle (200), the turning section (10) turning about an axis of a head tube (1A) of the bicycle (200),
wherein the turning section (10) includes:
an upper turning section (10A) that turns on an upper side of the head tube (1A); and
a lower turning section (10B) that turns on a lower side of the head tube (1A),
wherein the upper turning section includes:
an upper projected section (11B) of a steering column (11) that is axially supported by the head tube (1A), the upper projected section (11B) being projected to the upper side of the head tube (1A);
a handle stem (12) that is held by the upper projected section (11B); and
a handlebar (13) that is held by the handle stem (12), and
wherein the coupling section (23) is configured to be coupled to the upper turning section (10A), and
wherein the base section (121) is located between the handle stem (12) and a front wheel (16) of the bicycle (200).

9. The bicycle according to claim 8, wherein the upper turning section includes a screw that makes the handle stem hold the handlebar, and the coupling section is configured to be coupled by the screw.

10. The bicycle according to claim 9, wherein the coupling section is configured to be joined to the handle stem by the screw in a state where the handlebar is interposed between the coupling section and the handle stem.

11. The bicycle according to claim 10, wherein the turning section turns only at such an angle that the base section does not abut against a frame of the bicycle.

12. The bicycle according to claim 11, wherein the coupling section includes a stopper section that restricts turning of the turning section.

13. The bicycle according to claim 9, wherein the upper turning section includes a handle clamp that is joined to the handle stem by the screw in a state where the handlebar is interposed between the handle clamp and the handle stem, and the coupling section is configured to be fastened with the handle clamp by the screw.

14. The bicycle according to claim 8, wherein
the steering column is axially supported by the head tube via a bearing,
the upper turning section includes a pressurizing member that is joined to a tip of the upper projected section by a screw and pressurizes the bearing, and
the coupling section is configured to be coupled between the pressurizing member and the bearing.

15. The bicycle according to claim 14, wherein the handle stem is coupled between the pressurizing member and the bearing, and the coupling section is configured to be coupled between the handle stem and the bearing.

16. The bicycle according to claim 8, wherein the coupling section is configured to be coupled to the upper projected section.

17. The bicycle according to claim 8, wherein a brake fluid pipe that communicates with the channel is connected to a front surface of the base section.

18. A hydraulic pressure controller for controlling hydraulic pressure of a brake fluid that is at least supplied to a front-wheel braking section of a bicycle, the hydraulic pressure controller comprising:
a base section that is formed with a channel, through which the brake fluid flows therein;
a turning section including an upper turning section that turns on an upper side of a head tube; and a lower turning section that turns on a lower side of the head tube, the turning section being configured to turn about an axis of the head tube;
a valve that is attached to the base section and opens and closes the channel; and
a coupling section configured to couple the base section to the bicycle,
wherein the upper turning section includes: an upper projected section of a steering column, the upper projected section being projected to the upper side of the head tube; a handle stem that is held by the upper projected section; and a handlebar that is held by the handle stem,
wherein the coupling section is configured to be coupled to the upper turning section, and wherein the upper turning section includes a screw that makes the handle stem hold the handlebar, and the coupling section is configured to be coupled by the screw.

19. The hydraulic pressure controller according to claim 18, wherein the upper turning section includes a handle clamp that is joined to the handle stem by the screw in a state where the handlebar is interposed between the handle clamp and the handle stem, and the coupling section is configured to be fastened with the handle clamp by the screw.

20. The hydraulic pressure controller according to claim 18, wherein the coupling section is configured to be joined to the handle stem by the screw in a state where the handlebar is interposed between the coupling section and the handle stem.

* * * * *